UNITED STATES PATENT OFFICE.

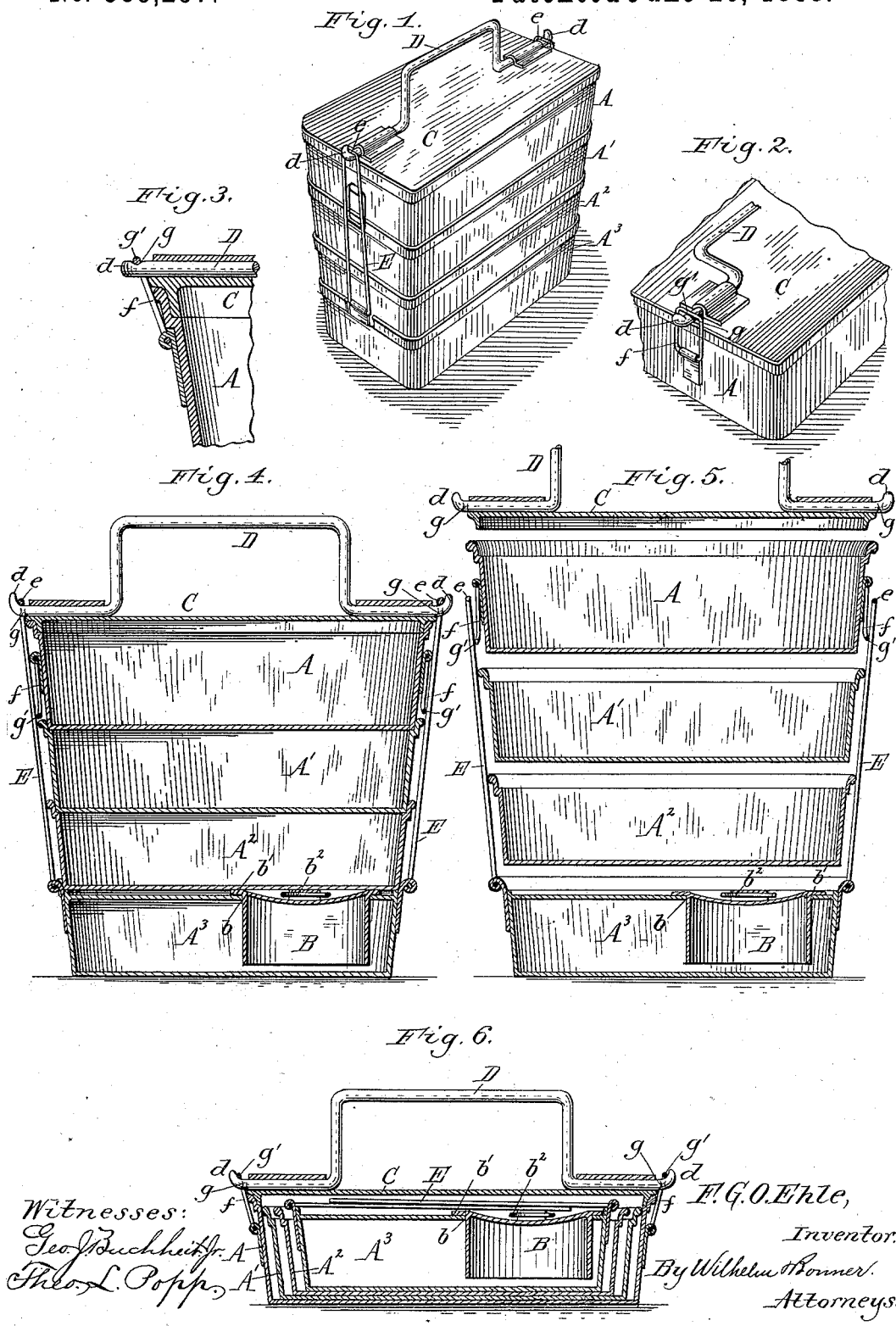

F. G. OSCAR EHLE, OF BUFFALO, NEW YORK.

DINNER-PAIL.

SPECIFICATION forming part of Letters Patent No. 385,257, dated June 26, 1888.

Application filed April 2, 1888. Serial No. 269,331. (No model.)

*To all whom it may concern:*

Be it known that I, F. G. OSCAR EHLE, of the city of Buffalo, in the county of Erie and State of New York, have invented new and useful Improvements in Dinner-Pails, of which the following is a specification.

This invention relates to that class of dinner-pails which consist of a series of independent superposed pans or vessels which are made tapering from their upper toward their lower ends, so that they can be nested when empty.

The object of my invention is to provide the pail with a simple and inexpensive fastening for securing together the several vessels of the pail both in position for use and when nested, and also to provide the pail with a removable receptacle for holding coffee or other drink.

The invention consists of the improvements which will be hereinafter fully set forth, and pointed out in the claims.

In the accompanying drawings, Figure 1 is a perspective view of my improved pail with the several pans or vessels superposed in position for containing victuals. Fig. 2 is a fragmentary perspective view showing the parts thereof nested. Fig. 3 is a fragmentary vertical longitudinal section of the pail, showing the manner of securing the cover when the parts are nested. Fig. 4 is a vertical longitudinal section thereof, showing the pans secured together in position for use. Fig. 5 is a similar view with the pans separated. Fig. 6 is a vertical longitudinal section of the pail with its pans nested.

Like letters of reference refer to like parts in the several figures.

A A' A² A³ represent the pans or vessels constituting the pail, each of which is provided with a closed bottom and an open top, excepting the lowermost vessel, A³, which serves as a liquid-receptacle, and is provided with a closed top, having an opening, $b$, which is closed by a drinking-cup, B. The latter is formed at its bottom with a flange, $b'$, which rests against the top of the liquid-vessel A³, and is provided with a pivoted ring or handle, $b^2$, for withdrawing the cup from said opening. The several pans are made tapering downwardly, so that the bottom of one pan will fit into the top of the pan next below and form a cover for the same, and so that the pans can be nested or placed one within the other when empty, so as to form a small and compact package. Each vessel is provided near its upper end with a square shoulder for supporting the pan above the same and for forming a tight joint between the parts.

C represents the removable cover applied to the top of the uppermost vessel, A, and D is a handle pivoted to the top of the cover, so that it can be folded against the cover. The outer ends of the handle D are provided with hooks or enlargements $d$, which project beyond the ends of the cover.

E E represent bails or loops pivoted at their lower ends to opposite end walls of the lowermost or liquid vessel, A³, and adapted to engage with the hooks or enlargements $d$ of the handle, so as to secure the several vessels together. The loops or bails E are made of such a length that their upper cross-bars, $e$, will fit over the outer ends of the handle D when the latter is folded against the cover and its hooks $d$ are parallel with the cross-bars $e$.

Upon turning the handle in a position at right angles to the cover the hooks $d$ will be turned upwardly at right angles to the upper cross-bars of the loops E, as represented in Figs. 1 and 4, and thereby retain the loops upon the ends of the handle and securely lock the pans together. Upon folding the handle against the cover the hooks $d$ will clear the cross-bars $e$ of the loops, when the latter can be stripped from the ends of the handle and the vessels be separated.

The outer portions of the handle adjacent to the hooks $d$ are preferably flattened and made oblong in cross-section, and the loops E are made to fit snugly over the ends of the handle when the wide portions of the handle rest against the cover, so that upon turning said wide portions at an angle to the cover the upper ends of the loops will be tightly drawn against the ends of the handle.

$f f$ represent short loops pivoted to opposite ends of the uppermost and largest vessel, A, and which are adapted to be engaged with the hooks $d$ of the handle for securing the cover C to said vessel when the vessels A' A² A³ are nested within the vessel A. The loops $f f$ are connected with and disconnected from the hooks $d$ in a manner similar to the loops E E.

The outer portions of the handle D are preferably provided on the inner sides of the hooks $d$ with notches $g$, in which the upper cross-bars, $g'$, of the loops $f$ engage when the handle is folded against the cover. This enables the collapsed pail to be carried in the pocket, while at the same time preventing the loops $f$ from becoming disengaged from the hooks, except by slightly springing the loops to draw their cross-bars out of said notches. When the parts are nested, the loops E are folded inwardly, so as to rest upon the top plate of the liquid-vessel $A^3$, as represented in Fig. 6. The upper edges of the end walls of the liquid-vessel $A^3$ are recessed, as shown in Fig. 1, to permit the bails or loops E to fold inwardly.

My improved fastening is very simple in construction, and forms a reliable connection between the parts of the pail both when extended and when collapsed.

I claim as my invention—

1. In a dinner-pail, the combination, with a series of superposed pans or vessels, of a cover applied to the uppermost vessel and provided with a handle having hooks or enlargements at its outer ends, and fastening bails or loops pivoted to the lowermost vessel and engaging with the hooks or enlargements of the handle, substantially as set forth.

2. In a dinner-pail, the combination, with a series of tapering superposed pans or vessels, of a cover, C, applied to the uppermost vessel and provided with a pivoted handle, D, having hooks or enlargements $d$ at its outer ends, loops or bails E, pivoted to the lowermost vessel and engaging with the hooks $d$, and loops $f$, pivoted to the uppermost or largest of said vessels and adapted to engage with the hooks $d$ when the vessels are nested, substantially as set forth.

3. The combination, with the series of tapering superposed vessels and the cover C, applied to the uppermost vessel, of a handle pivoted to said cover and provided with hooks $d$ and notches $g$, and loops $f$, pivoted to said uppermost vessel and adapted to engage with the hooks $d$ when the handle stands at an angle to the cover and in said notches when the handle is folded against the cover, substantially as set forth.

Witness my hand this 27th day of March, 1888.

F. G. OSCAR EHLE.

Witnesses:
CARL F. GEYER,
FRED. C. GEYER.